US009646213B2

(12) United States Patent
Shimomura et al.

(10) Patent No.: US 9,646,213 B2
(45) Date of Patent: May 9, 2017

(54) SURVEY APPARATUS, COMPUTER-READABLE STORAGE MEDIUM AND SURVEY METHOD

(71) Applicant: FUJITSU LIMITED, Kawasaki-shi (JP)

(72) Inventors: Teruo Shimomura, Oita (JP); Shin Totoki, Oita (JP); Kazuyoshi Kuzunishi, Hasuda (JP)

(73) Assignee: FUJITSU LIMITED, Kawasaki (JP)

( * ) Notice: Subject to any disclaimer, the term of this patent is extended or adjusted under 35 U.S.C. 154(b) by 341 days.

(21) Appl. No.: 13/680,146

(22) Filed: Nov. 19, 2012

(65) Prior Publication Data

US 2013/0163820 A1 Jun. 27, 2013

(30) Foreign Application Priority Data

Dec. 27, 2011 (JP) .................................. 2011-286682

(51) Int. Cl.
*G06K 9/66* (2006.01)
*G06K 9/36* (2006.01)
(Continued)

(52) U.S. Cl.
CPC ........... *G06K 9/00791* (2013.01); *G06K 9/34* (2013.01); *G06K 9/46* (2013.01)

(58) Field of Classification Search
None
See application file for complete search history.

(56) References Cited

U.S. PATENT DOCUMENTS 6,515,597 B1 * 2/2003 Wada et al. ................... 340/988
6,731,331 B1 * 5/2004 Watabe et al. ................ 348/144
(Continued)

FOREIGN PATENT DOCUMENTS

CN 101137890 A 3/2008
JP 2001-186511 7/2001
(Continued)

OTHER PUBLICATIONS

Japanese Office Action mailed Jun. 23, 2015 for corresponding Japanese Patent Application No. 2011-286682, with Partial English Translation, 4 pages.
(Continued)

*Primary Examiner* — Matthew Bella
*Assistant Examiner* — Jose M Torres
(74) *Attorney, Agent, or Firm* — Fujitsu Patent Center

(57) ABSTRACT

A determination unit determines, on images of video data where a road set as a survey target was shot in different times, whether or not the shooting position of the image is within a tolerance value with the shooting position of any of the images as a reference, for each image having a corresponding shooting position. When the shooting position is determined to be within the tolerance value, a creation unit creates screen information of a screen where images that has been determined to be within the tolerance value is displayed in synchronization. Moreover, when the shooting position is determined to be beyond the tolerance value, the creation unit creates screen information of a screen where an image that has been determined to be beyond the tolerance value is undisplayed.

5 Claims, 16 Drawing Sheets

(51) Int. Cl.
   *G06K 9/32* (2006.01)
   *G06K 9/00* (2006.01)
   *G06K 9/34* (2006.01)
   *G06K 9/46* (2006.01)

(56) References Cited

U.S. PATENT DOCUMENTS

| | | | |
|---|---|---|---|
| 6,798,908 B2 | 9/2004 | Miyatake et al. | |
| 6,798,909 B2 | 9/2004 | Miyatake et al. | |
| 7,571,051 B1* | 8/2009 | Shulman | 701/487 |
| 7,697,727 B2* | 4/2010 | Xu et al. | 382/108 |
| 7,801,333 B2* | 9/2010 | Laurent et al. | 382/108 |
| 8,174,576 B2* | 5/2012 | Akatsuka et al. | 348/148 |
| 2007/0061076 A1 | 3/2007 | Shulman | |
| 2009/0015685 A1 | 1/2009 | Shulman | |
| 2009/0278938 A1 | 11/2009 | Shulman | |
| 2012/0162249 A1* | 6/2012 | Tsuda et al. | 345/629 |
| 2013/0170701 A1* | 7/2013 | Suzuki | G06T 7/00 382/103 |

FOREIGN PATENT DOCUMENTS

| | | |
|---|---|---|
| JP | 2002-357557 | 12/2002 |
| JP | 2008-527542 A | 7/2008 |
| JP | 2009-239397 A | 10/2009 |
| JP | 2010-151658 A | 7/2010 |
| JP | 2011-139468 A | 7/2011 |

OTHER PUBLICATIONS

Chinese Office Action mailed Jun. 30, 2015 for corresponding Chinese Patent Application No. 201210491165.4, with English Translation, 16 pages.
Chinese Office Action mailed Jan. 25, 2016 for corresponding Chinese Patent Application No. 201210491165.4, with English Translation, 12 pages.
Chinese Office Action mailed May 5, 2016 for corresponding Chinese Patent Application No. 201210491165.4, with English Translation, 14 pages.

* cited by examiner

FIG.2

| DATA NAME | HIERARCHICAL STRUCTURE | USE |
|---|---|---|
| caption | – | DATA NAME AND COMMENT |
| date | – | RECORD START DATE AND TIME |
| pointData | lat | COORDINATE VALUE OF LATITUDE |
| | lng | COORDINATE VALUE OF LONGITUDE |
| | movie | FILE NAME OF VIDEO DATA |
| | frame | POSITION OF IMAGE (ELAPSED TIME FROM START) |

FIG.3

```
<DataTable caption="IDENTIFIED B SECTION: ROAD A, ROAD B  date="2011/12/01 10:00:00" >
  <pointData lat="33.23382" lng="131.60612" movie="b2.flv" frame="12:55:45" />
  <pointData lat="33.23356" lng="131.60626" movie="b2.flv" frame="12:56:21" />
  <pointData lat="33.23343" lng="131.60623" movie="b2.flv" frame="12:56:87" />
  <pointData lat="33.23321" lng="131.60627" movie="b2.flv" frame="12:57:45" />
</DataTable>
```

SURVEY APPARATUS, COMPUTER-READABLE STORAGE MEDIUM AND SURVEY METHOD

CROSS-REFERENCE TO RELATED APPLICATION

This application is based upon and claims the benefit of priority of the prior Japanese Patent Application No. 2011-286682, filed on Dec. 27, 2011, the entire contents of which are incorporated herein by reference.

FIELD

The embodiments discussed herein are directed to a survey apparatus, a survey program, and a survey method.

BACKGROUND

Degradation such as a pothole, a rut, and a crack occurs in the pavement of a road due to passage of vehicles and change over time. The repair cost of a road is small if the road surface has little degradation. Therefore, it is desired to find the degradation of a road surface in the early stage.

Hence, for example, it is being discussed to mount a camera on a road patrol vehicle that patrols roads regularly, and the like to shoot the roads, and survey the degradation of the road surfaces from the shot images. For example, proposed is a technology for detecting abnormalities of roads, surrounding facilities, and the like by comparing two video data shot by an imaging camera mounted on a patrol vehicle in similar positions on different dates by use of an image processing technology. Moreover, for example, proposed is a technology for obtaining the degree of difference between an inputted image and a preregistered background image on a pixel basis and determining whether or not there is an intruding object based on the degree of difference.

Patent Literature 1: Japanese Laid-open Patent Publication No. 2002-357557

Patent Literature 2: Japanese Laid-open Patent Publication No. 2001-186511

However, a road may have a plurality of lanes. Therefore, a different imaging target may be displayed even if an image that was shot on a similar route in the past is displayed.

An object of the technology of the disclosure is to provide a survey apparatus, a survey program and a survey method, which plays back only images where the same target is displayed in synchronization when a plurality of images is displayed in synchronization, corresponding to their positions.

SUMMARY

According to an aspect of an embodiment, a survey apparatus includes a storage unit that stores a plurality of pieces of image information including a plurality of images of a road, the images having been continuously shot by a shooting unit mounted on a vehicle, and a plurality of pieces of position information indicating shooting positions of the images of the corresponding pieces of image information; a determination unit that determines on images of image information where a road set as a survey target was shot based on the plurality of pieces of image information and the plurality of pieces of position information, which are stored in the storage unit, whether or not the shooting position of the image is within a tolerance value with a shooting position of any of the images as a reference for each image having a corresponding shooting position; a creation unit that, when the determination unit determines that the shooting position is within the tolerance value, creates screen information of a screen where images that has been determined to be within the tolerance value is displayed in synchronization, and when the shooting position is determined to be beyond the tolerance value, creates screen information of a screen where an image that has been determined to be beyond the tolerance value is undisplayed; and an output unit that outputs the screen information created by the creation unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view illustrating an example of tags used for position data;

FIG. 3 is a view illustrating an example of the data configuration of position data;

DESCRIPTION OF EMBODIMENTS

Preferred embodiments of the present invention will be explained with reference to accompanying drawings. It is possible to appropriately combine the embodiments within a range that does not contradict the process contents. A description will be given below of a case of application to the survey system.

[a] First Embodiment

Figure 1:
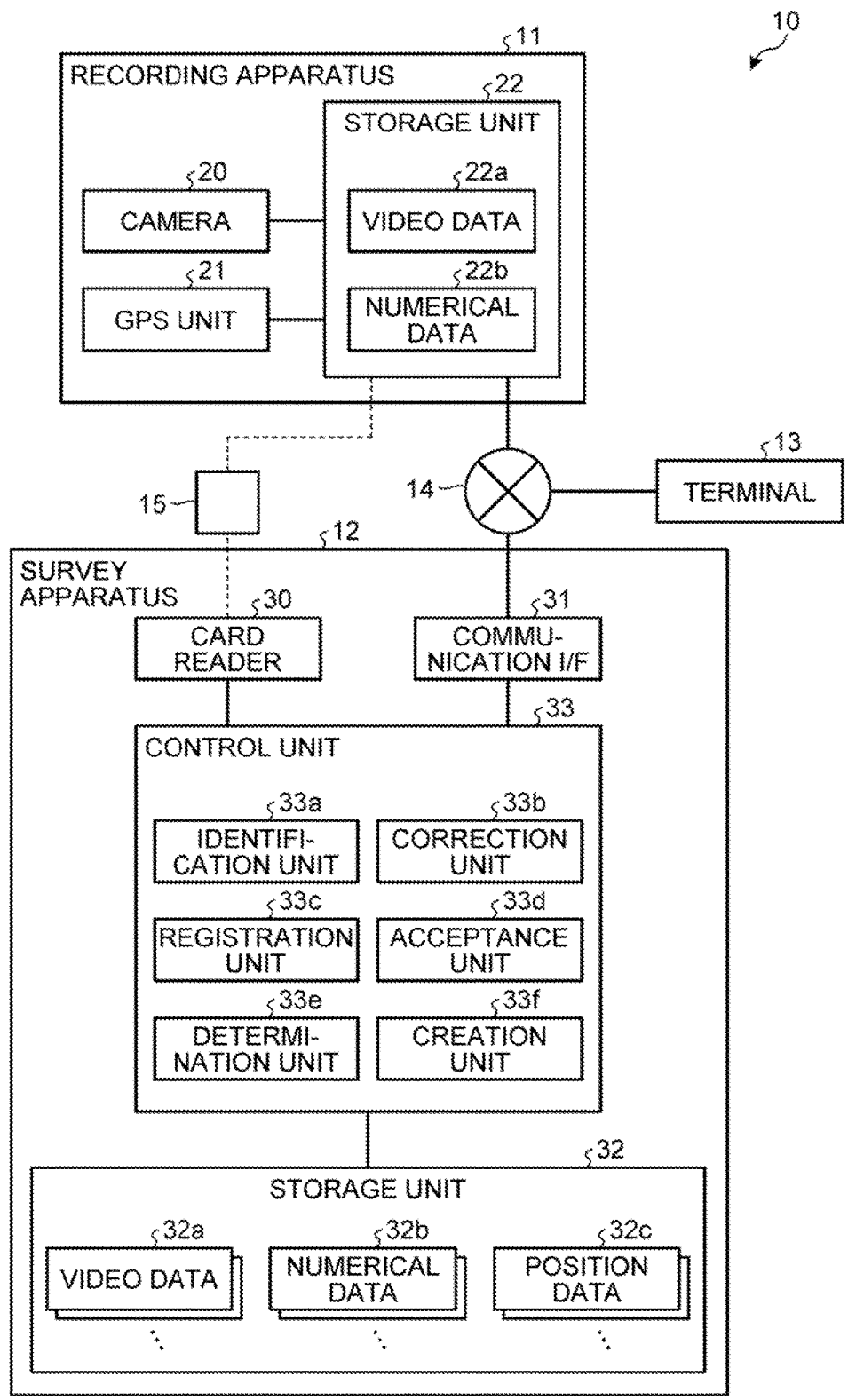
FIG. 1 is a view illustrating an example of a schematic configuration of an entire survey system including a survey apparatus.

A description will be given of a survey system according to a first embodiment. FIG. 1 is a view illustrating an example of a schematic configuration of the entire survey system including a survey apparatus. As illustrated in FIG. 1, a survey system 10 includes a recording apparatus 11, a survey apparatus 12, and a terminal 13. The recording apparatus 11, the survey apparatus 12, and the terminal 13 can exchange various information. For example, the recording apparatus 11, the survey apparatus 12, and the terminal 13 are connected via a network 14 in a communicable manner, and can exchange various information. Aspects of such the network 14 include arbitrary communication networks such as mobile communication including a mobile phone, the Internet (Internet), LAN (Local Area Network), and VPN (Virtual Private Network), regardless of wired or wireless. Moreover, the recording apparatus 11 and the survey apparatus 12 can exchange various information via a memory card 15.

The recording apparatus 11 is a device that is mounted on a vehicle that runs on the road, such as a road patrol vehicle, and stores the continuously shot images of a road, and the shooting positions of the images. The recording apparatus 11 includes a shooting unit (hereinafter described as a camera 20 as an example in the embodiment. However, one other than a camera may be used if it can take an image or video.), a GPS (Global Positioning System) unit 21 and a storage unit 22.

The camera 20 shoots a road continuously and creates image information of a plurality of continuously shot images of the road. For example, the camera 20 is a video camera installed in a position where the road can be shot in directions of the front and rear of a vehicle. The camera 20 shoots the road continuously at a predetermined frame rate, and creates video data 22a of continuously shot images as the image information. It is sufficient if the frame rate is around a rate that a part of the road is shown in an overlapping manner between adjacent images upon shooting continuously from the running vehicle. For example, 24 fps (frame per second), 30 fps, 60 fps, and the like are cited.

Whenever receiving a signal from a GPS satellite, the GPS unit 21 calculates a current position indicated by latitude and longitude based on the received signal, and creates numerical data 22b including the current position and a date and time when the current position was calculated.

Various information is stored in the storage unit 22. For example, the video data 22a created by the camera 20 are stored in the storage unit 22. Moreover, the numerical data 22b created by the GPS unit 21 are stored in the storage unit 22. Device examples of the storage unit 22 include storage devices such as semiconductor memory, such as flash memory and NVSRAM (Non Volatile Static Random Access Memory), that can rewrite data, a hard disk, and an optical disc. The video data 22a and the numerical data 22b, which are stored in the storage unit 22, are transmitted to the survey apparatus 12 via the network 14 or the memory card 15. For example, the recording apparatus 11 transmits the numerical data 22b to the survey apparatus 12 via the network 14 at any time. Moreover, the recording apparatus 11 stores the video data 22a in the memory card 15 by a user's operation. The user carries the memory card 15 to install the memory card 15 in a card reader 30, which will be described later, of the survey apparatus 12; accordingly, the video data 22a are transmitted to the survey apparatus 12. Both of the numerical data 22b and the video data 22a may be transmitted to the survey apparatus 12 via the memory card 15. Moreover, both of the numerical data 22b and the video data 22a may be transmitted to the survey apparatus 12 via the network 14.

The survey apparatus 12 is a physical server used for a survey of the state of road degradation, and is, for example, a server computer provided to a company that conducts data sensing, and a road survey. The terminal 13 is a computer used by a user who conducts a road survey, and is, for example, a client computer provided to a company that conducts a road survey. The survey apparatus 12 transmits image information of various operation screens to the terminal 13 to display various operation screens, receives operation information that indicates the contents of the operations from the terminal 13, and accordingly enables the user to perform various operations from the terminal 13. The survey apparatus 12 includes the card reader 30, a communication I/F (Interface) 31, a storage unit 32, and a control unit 33.

The card reader 30 is an interface that reads data stored in the memory card 15 and writes data on the memory card 15. The card reader 30 acquires various information from the recording apparatus 11 via the memory card 15. For example, the card reader 30 acquires the video data 22a from the recording apparatus 11.

The communication I/F 31 includes at least one port and is an interface that controls communication with the recording apparatus 11 and the terminal 13. The communication I/F 31 acquire various information from the recording apparatus 11 via the network 14. For example, the communication I/F 31 acquires the numerical data 22b from the recording apparatus 11. Moreover, the communication I/F 31 transmits and receives various information to and from the terminal 13 via the network 14. For example, the communication I/F 31 transmits the image information of various operation screens to the terminal 13. The communication I/F 31 receives from the terminal 13 operation information indicating the contents of the operations on the operation screens. In other words, the survey apparatus 12 outputs the image information of various operation screens from the communication I/F 31 to display on the terminal 13.

Various information is stored in the storage unit 32. For example, video data 32a, numerical data 32b, and position data 32c are stored in the storage unit 32. Device examples of the storage unit 32 include storage devises such as semiconductor memory, such as flash memory and NVSRAM, that can rewrite data, a hard disk, and an optical disc.

The video data 32a are the video data 22a acquired from the recording apparatus 11. Images of a road, which were shot continuously by the camera 20 of the recording apparatus 11 when the vehicle ran, are recorded in the video data 32a. The numerical data 32b is the numerical data 22b acquired from the recording apparatus 11. A road position calculated by the GPS unit 21 of the recording apparatus 11 when the vehicle ran, and a date and time when the position was calculated are stored in the numerical data 32b.

The position data 32c are information indicating the shooting positions of the images recorded in the video data 22a. In the embodiment, the position data 32c are configured in an XML (Extensible Markup Language) format. FIG. 2 is a view illustrating an example of tags used for position data. As illustrated in FIG. 2, the position data 32c include items whose data names are "caption," "date," and "pointData" as tags. "caption" is a tag used when a data name and a comment are embedded. In the embodiment, a passage road is set as a comment. "date" is a tag used when a record start date and time of video data to be associated with a position is embedded. "pointData" is a tag used when the shooting position of each image is embedded. "pointData" is further developed into layers of lower items of "lat", "lng", "movie", and "frame". "lat" is a tag used when a coordinate value of latitude representing a shooting position is embedded. "lng" is a tag used when the coordinate value of longitude representing a shooting position is embedded. "movie" is a tag used when a file name of video data to be associated with a shooting position is embedded. "frame" is a tag used when the position of an image to be associated with a shooting position is embedded with the elapsed time of a first frame of video data.

FIG. 3 is a view illustrating an example of the data configuration of position data. As illustrated in FIG. 3, data are embedded in the position data 32c by using their respective tags described in FIG. 2. The example of FIG. 3 illustrates that "IDENTIFIED B SECTION," and "ROAD A" and "ROAD B" are embedded as the data name of position data and passage roads, respectively, by the tag of "caption." Moreover, the example of FIG. 3 illustrates that the record start date and time of video data to be associated with a position is "Jan. 12, 2011 10:00:00" by the tag of "date." Moreover, the example of FIG. 3 illustrates that the shooting position of an image of a frame at a lapse of "12 minutes 55 seconds 45" since the start of video data whose file name is "b2.flv" is a latitude of "33 degrees 23 minutes 382 seconds" and a longitude of "131 degrees 60 minutes 612 seconds." Moreover, illustrated is that the shooting position of an image of a frame at a lapse of "12 minutes 56 seconds 21" since the start of the video data whose file name is "b2.flv" is a latitude of "33 degrees 23 minutes 356 seconds" and a longitude of "131 degrees 60 minutes 626 seconds." Moreover, illustrated is that the shooting position of an image of a frame at a lapse of "12 minutes 56 seconds 87" since the start of the video data whose file name is "b2.flv" is a latitude of "33 degrees 23 minutes 343 seconds" and a longitude of "131 degrees 60 minutes 623 seconds." Moreover, illustrated is that the shooting position of an image of a frame at a lapse of "12 minutes 57 seconds 45" since the start of the video data whose file name is "b2.flv" is a latitude of "33 degrees 23 minutes 321 seconds" and a longitude of "131 degrees 60 minutes 627 seconds." In the embodiment, with regard to a position, it is assumed that the latitude is a north latitude, and the longitude is an east longitude, and symbols representing them are omitted; however, symbols are attached if a north latitude, a south latitude, an east longitude and a west longitude are distinguished as a position. For example, with regard to the latitude, in the case of the north latitude, "N" is attached to the start, and in the case of the south latitude, "S" is attached to the start. With regard to the longitude, in the case of the east longitude, "E" is attached to the start, and in the case of the west longitude, "W" is attached to the start.

The position data 32c are created by a registration unit 33c, which will be described later, and are registered in the storage unit 32. Moreover, the position data 32c are used for a process to be executed in a creation unit 33f, which will be described later.

Returning to FIG. 1, the control unit 33 is an electronic circuit, such as a CPU, that includes internal memory, and includes an identification unit 33a, a correction unit 33b, the registration unit 33c, an acceptance unit 33d, a determination unit 33e, and the creation unit 33f.

Here, the GPS unit 21 calculates a position in a cycle of approximately one to several seconds, which is longer than the shooting cycle of the camera 20. Therefore, the shooting positions of only part of images are recorded in the numerical data 32b.

The identification unit 33a makes various identifications. For example, the identification unit 33a identifies the shooting positions of images of frames of the video data 32a by interpolation from the shooting positions of part of the images included in the numerical data 32b. The identification unit 33a obtains the shooting date and time of an image of each frame from the record start date and time and the frame rate of the video data 32a, for example. The identification unit 33a then identifies a shooting position at the date and time of an image of each frame by interpolation from the position and the date and time calculated from the position, which are included in the numerical data 32b. The interpolation may be any interpolation method such as linear interpolation and spline interpolation. With regard to the record start date and time, if the record start date and time is recorded in the video data 32a, this date and time may be used. Moreover, the recording apparatus 11 synchronizes the calculation of a position by the GPS unit 21 with shooting by the camera 20, and if positions and dates and times during a shooting period are recorded in the numerical data 32b, the identification unit 33a may set a first date and time of the shooting period of the numerical data 32b as the record start date and time. Moreover, the identification unit 33a may transmit to the terminal 13 the image information of a date and time input screen on which a record start date and time is inputted to display the date and time input screen, and set a date and time inputted on the date and time input screen as the record start date and time.

Figure 4:
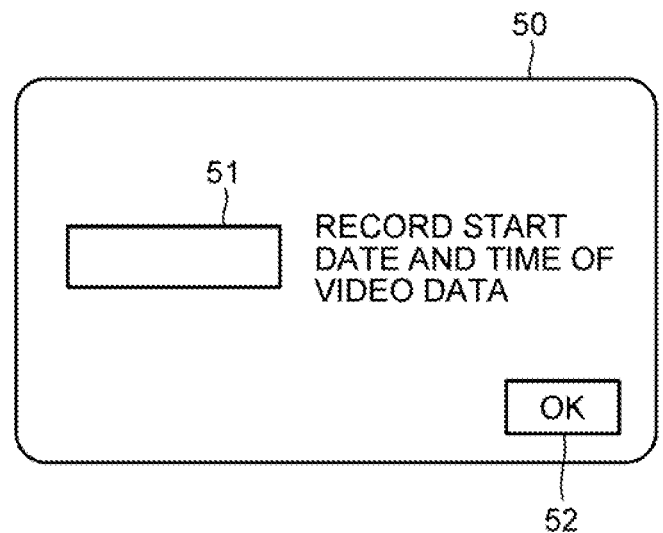
FIG. 4 is a view illustrating an example of a date and time input screen.

FIG. 4 is a view illustrating an example of the date and time input screen. As illustrated in FIG. 4, a date and time input screen 50 is provided with an input area 51 in which a record start date and time is inputted. After a record start date and time is inputted in the input area 51, an OK button 52 is selected on the date and time input screen 50 to specify the record start date and time.

The correction unit 33b makes various corrections. For example, the correction unit 33b corrects the shooting positions of the images of the video data 32a, the shooting positions having been identified by the identification unit 33a. The correction unit 33b, for example, transmits to the terminal 13 the image information of a position correction screen, where the identified shooting positions of the images of the video data 32a are mapped on a map, to display the position correction screen, and accepts the corrections of the shooting positions of the images of the frames.

Figure 5:
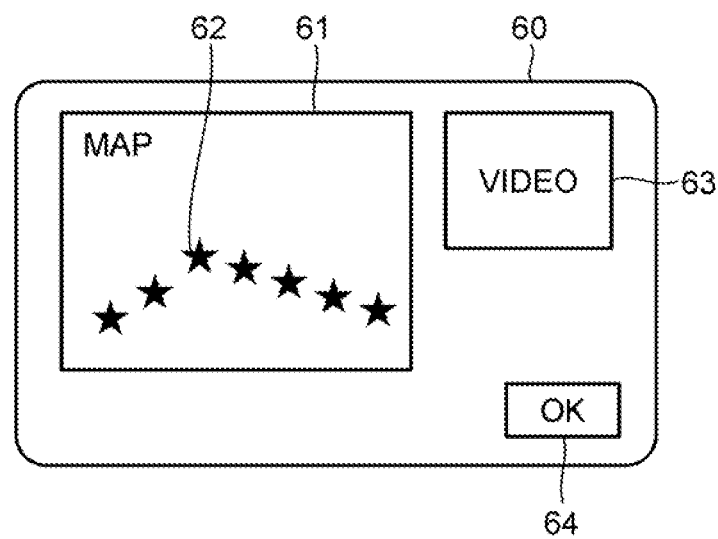
FIG. 5 is a view illustrating an example of a position correction screen.

FIG. 5 is a view illustrating an example of the position correction screen. As illustrated in FIG. 5, a position correction screen 60 includes a display area 61 that displays an image where the shooting positions of the images of the frames of the video data 32a have been mapped on the map. In the example of FIG. 5, the shooting positions mapped on the map in the display area 61 are indicated by marks 62. On the position correction screen 60, it is possible to move the position of the mark 62 by performing a predetermined move operation such as a drag on the mark 62. Moreover, on the position correction screen 60, an image corresponding to the mark 62 is displayed in a display area 63 by performing a predetermined specification operation such as a click on the mark 62. On the position correction screen 60, an OK button 64 is selected after the position of the mark 62 is corrected; accordingly, the corrected shooting positions of the images are specified. The correction unit 33b may, for example, map the identified shooting positions of the images of the frames of the video data 32a on the map, and perform map matching so as to place a path connecting the shooting positions on a road on the map to automatically correct the shooting positions of the images. Map information may be preregistered in the storage unit 32, or may appropriately be acquired from a server of a supplier of a service to provide map information.

The registration unit 33c conducts various types of registration. For example, if the shooting positions of the images are specified by the position correction screen 60, the registration unit 33c maps the specified shooting positions of the images on the map, and identifies the passage road that has passed, from the shooting positions. The registration unit 33c then sets the identified passage road as a comment, and registers in the storage unit 32 the position data 32c indicating the shooting positions of the images specified by the position correction screen 60.

The acceptance unit 33d performs various types of acceptance. For example, the acceptance unit 33d receives specification of the video data 32a used for a survey. For example, the acceptance unit 33d transmits to the terminal 13 image information of a video data specification screen that specifies the video data 32a used for a survey to display the video data specification screen, and accepts the specification of the video data 32a used for the survey.

Figure 6:
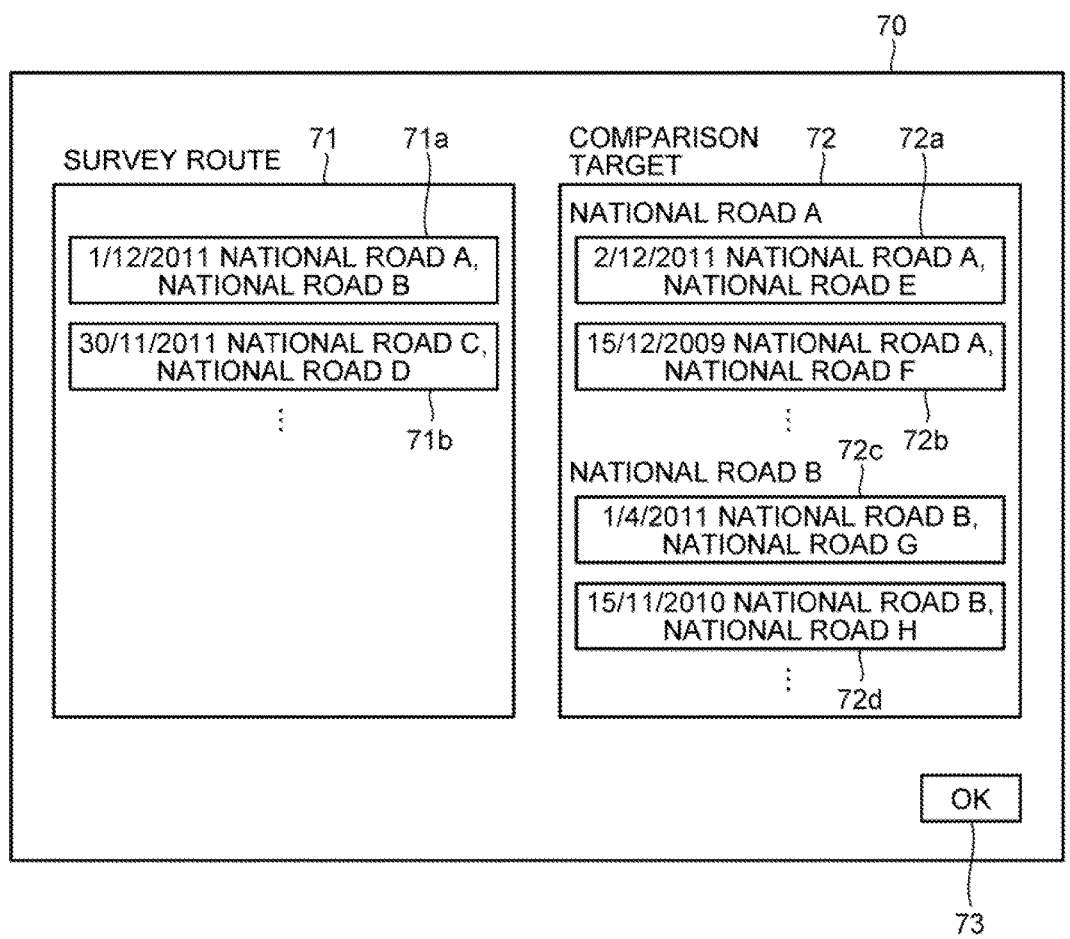
FIG. 6 is a view illustrating an example of a video data specification screen.

FIG. 6 is a view illustrating an example of the video data specification screen. As illustrated in FIG. 6, a video data specification screen 70 includes a selection area 71 for selecting a survey route. In the selection area 71, the record start dates and times of the video data 32a and the passage roads stored in the comment are read from each of the position data 32c stored in the storage unit 32, and the date of the record start date and time and the passage roads are displayed line by line for each of the position data 32c. In the example of FIG. 6, a line 71a indicates the passage on national roads A and B on Dec. 1, 2011. Moreover, a line 71b indicates the passage on national roads C and D on Nov. 30, 2011. On the video data specification screen 70, it is possible to select a survey route by performing a predetermined specification operation such as a click on any line displayed in the selection area 71. The images of the video data 32a selected as the survey route in the selection area 71 of the video data specification screen 70 serve as reference images, which will be described later.

Moreover, the video data specification screen 70 includes a selection area 72 for selecting video data 32a of a comparison target. If any line in the selection area 71 is selected on the video data specification screen 70, the dates of the record start dates and times and the passage roads of the video data 32a indicating the passage on the same road are displayed line by line in the selection area 72 for each passage road of the survey route, other than the video data 32a of the selected line. The example of FIG. 6 illustrates the result where the line 71a has been selected in the selection area 71. In the example of FIG. 6, lines 72a and 72b illustrate that there are the video data 32a indicating the passage on the national road A and a national road E on Dec. 2, 2011 and the video data 32a indicating the passage on the national road A and a national road F on Dec. 15, 2009 as the video data 32a indicating the passage on the national road A. Moreover, in the example of FIG. 6, lines 72c and 72d illustrate that there are the video data 32a indicating the passage on the national road B and a national road G on Apr. 1, 2011, and the video data 32a indicating the passage on the national road B and a national road H on Nov. 15, 2010 as the video data 32a indicating the passage on the national road B. On the video data specification screen 70, the video data 32a of the survey route and the video data 32a of the comparison target are specified by selecting any line displayed in the selection area 71, selecting any line displayed in the selection area 72, and subsequently selecting an OK button 73.

The determination unit 33e makes various determinations. For example, with regard to the images of the video data 32a of the survey route, the determination unit 33e identifies the images of the video data 32a of the comparison target, the images having corresponding shooting positions, for each of the passage roads of the survey route. For example, with regard to the images of the video data 32a of the survey route, the determination unit 33e identifies the images of the video data 32a of the comparison target, the images having the closest shooting positions, as images having corresponding shooting positions, based on the position data 32c of the video data 32a of the survey route and the comparison target. The determination unit 33e then determines whether or not the shooting position of the image of the video data 32a set as the comparison target is within a tolerance value with the shooting position of the image of the video data 32a set as the survey route as a reference for each image having a corresponding shooting position.

The tolerance value is defined based on the distance between imaging positions. Specifically, the tolerance value is defined with a reference of whether or not the same place is displayed in each image upon comparison of a plurality of images. For example, a region shown in an image shot by the camera 20 can be set as a tolerance area. A distance value in three-dimensional space in the region shown in the image can be decided by prior shooting calibration and is calculated from the fixing angle of the camera 20 and the camera's angle of view (an area that the lens can show). It is defined that a limit width in a longitudinal direction of an image that can recognize a road surface corresponds to a tolerance value of a distance in a depth direction, and an area width in a lateral direction of the image corresponds to a tolerance value of a distance in a right and left direction.

If the same direction is shot from two imaging positions, regions shown in images from the respective positions of the two imaging positions are identified, and if the identified regions overlap with each other, they are set as imaging targets. Whether or not the regions shown in the images overlap is determined by the distance between the imaging positions. Hence, it is possible to determine the tolerance value by the distance between the imaging positions. The determination unit 33e determines whether or not a region that can be compared is displayed in an imaging area by using the tolerance value determined in accordance with the distance between the imaging positions.

Vehicles running in the same direction on the road are considered to be imaging the same direction in many cases, and accordingly may be distinguished only by the imaging positions. However, even if the shooting positions are the same, if the shooting directions are different, the same place is not displayed in some cases. Therefore, the calculations of whether or not the shooting areas overlap may be made taking the shooting directions into account. The shooting direction may be obtained from a movement direction from an immediately previous shooting position to a shooting position of a determination target, for example.

If the process is made simple, the tolerance value may be set to be one lane's distance. By setting the tolerance value in this manner, it is possible to distinguish whether corresponding images were shot running in the same section and lane.

The creation unit 33f creates various information. For example, the creation unit 33f creates image information of various screens such as a survey screen and a playback screen, which will be described later, and transmits the created image information to the terminal 13 to display various screens for a road survey. Moreover, on the survey screen and the playback screen, if the determination unit 33e determines that the shooting position is within the tolerance value, the creation unit 33f displays the images that have been determined to be within the tolerance value in synchronization, and if it is determined that the shooting position is beyond the tolerance value, the image that has been determined to be beyond the tolerance value is set to be undisplayed.

For example, if the video data 32a of the survey route and the video data 32a of the comparison target are specified and the OK button 73 is selected on the video data specification screen 70 illustrated in FIG. 6, the creation unit 33f transmits the image information of the survey screen to the terminal 13 to display the survey screen.

Figure 7:
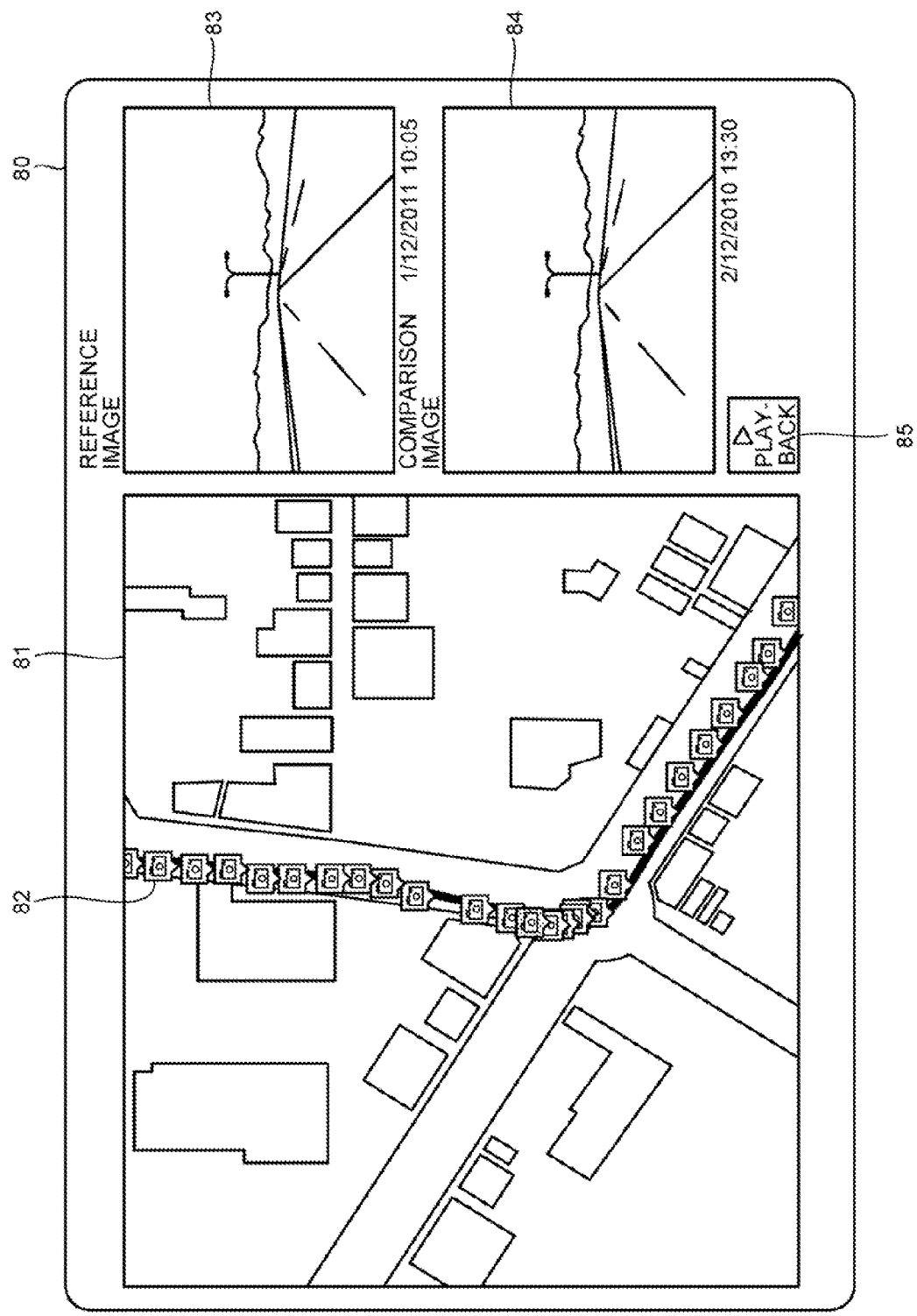
FIG. 7 is a view illustrating an example of a survey screen.
Figure 8:
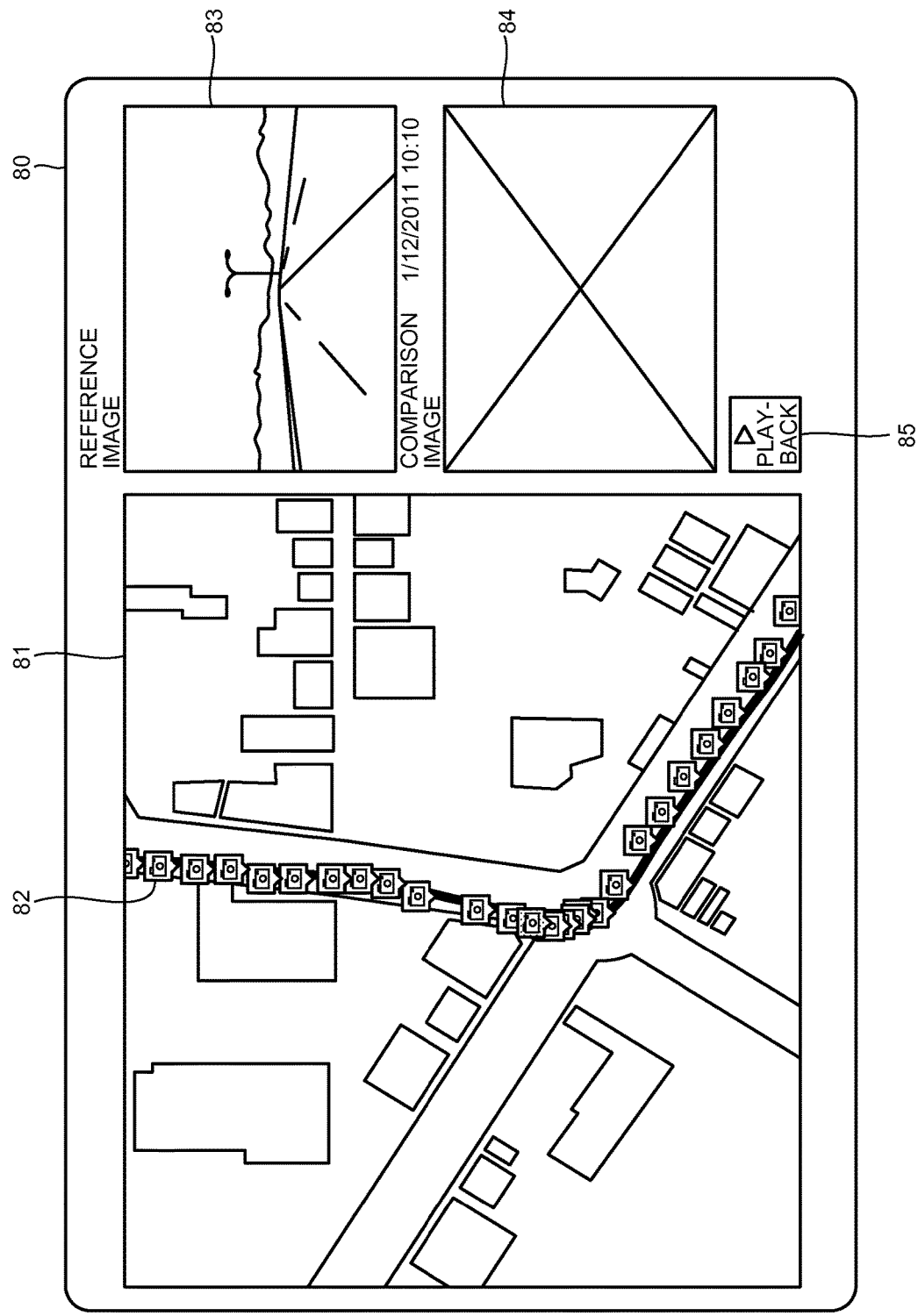
FIG. 8 is a view illustrating an example of the survey screen where an image of a comparison target has become undisplayed.

FIG. 7 is a view illustrating an example of the survey screen. As illustrated in FIG. 7, a survey screen 80 includes a display area 81 that displays an image where the shooting positions of images of the video data 32a set as the survey route are mapped on the map. In the example of FIG. 7, the shooting positions mapped on the map in the display area 81 are indicated by marks 82. Moreover, the survey screen 80 includes a display area 83 that displays the images of the video data 32a of the survey route as reference images and a display area 84 that displays the images of the video data 32a of the comparison target as comparison images. A reference image corresponding to the mark 82 is displayed in the display area 83 on the survey screen 80 by performing a predetermined specification operation such as a click on the mark 82. Moreover, if the corresponding shooting position of the image of the comparison target is within the tolerance value with the shooting position of the reference image as a reference, the image of the comparison target is displayed in the display area 84 on the survey screen 80 in synchronization. On the other hand, if the corresponding shooting position of the image of the comparison target is beyond the tolerance value with the shooting position of the reference image as a reference, the image of the comparison target becomes undisplayed and the image is not displayed in the display area 84 on the survey screen 80. FIG. 8 is a view illustrating an example of the survey screen where the image of the comparison target has become undisplayed. In the example of FIG. 8, the corresponding shooting position of the image of the comparison target is beyond the tolerance value with the shooting position of the reference image as a reference; accordingly, an "x" sign is displayed in the display area 84 and the image of the comparison target is undisplayed.

Figure 9:
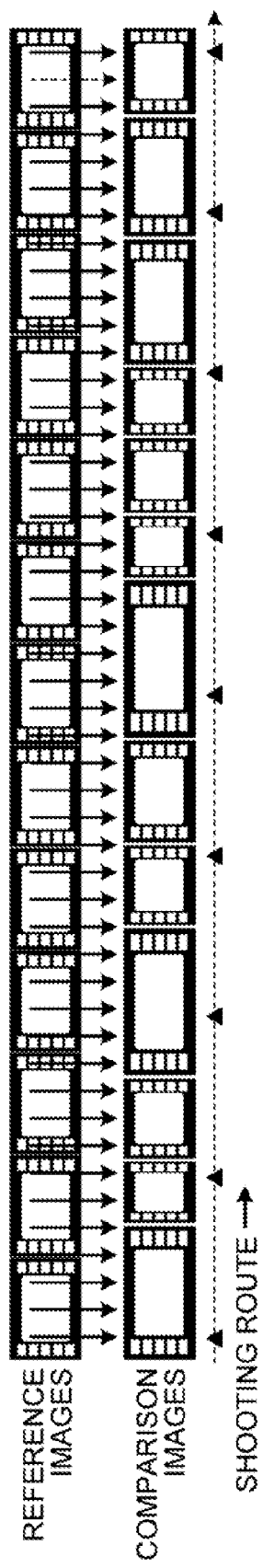
FIG. 9 is a view schematically illustrating the playback of video data.

The survey screen 80 includes a playback button 85 to instruct the playback of the video data 32a. The creation unit 33f sets a specified position as a playback start position if the specification operation is performed on the mark 82, and sets the start of the video data 32a of the survey route as the playback start position if the specification operation is not performed on the mark 82. If the playback button 85 is selected, the creation unit 33f transmits to the terminal 13 the image information of the playback screen to play back the video data 32a of the survey route and the video data 32a of the comparison target next to each other from the playback start position to display on the playback screen. In synchronization with the images of the video data 32a of the survey route, the corresponding images of the video data 32a of the comparison target are displayed on the playback screen. FIG. 9 is a view schematically illustrating the playback of video data. The creation unit 33f displays the images of the video data 32a of the survey route as the reference images at a frame rate at the time of shooting. Moreover, the creation unit 33f displays the images of the video data 32a of the comparison target as the comparison images in synchronization with the images of the video data 32a of the survey route. The example of FIG. 9 illustrates that intervals of the images of the reference images is set to be constant and the widths of the images of the comparison images are changed, and accordingly the corresponding comparison images are displayed in accordance with the reference images. In accordance with the reference images, the corresponding comparison images are successively displayed on the playback screen.

Figure 10:
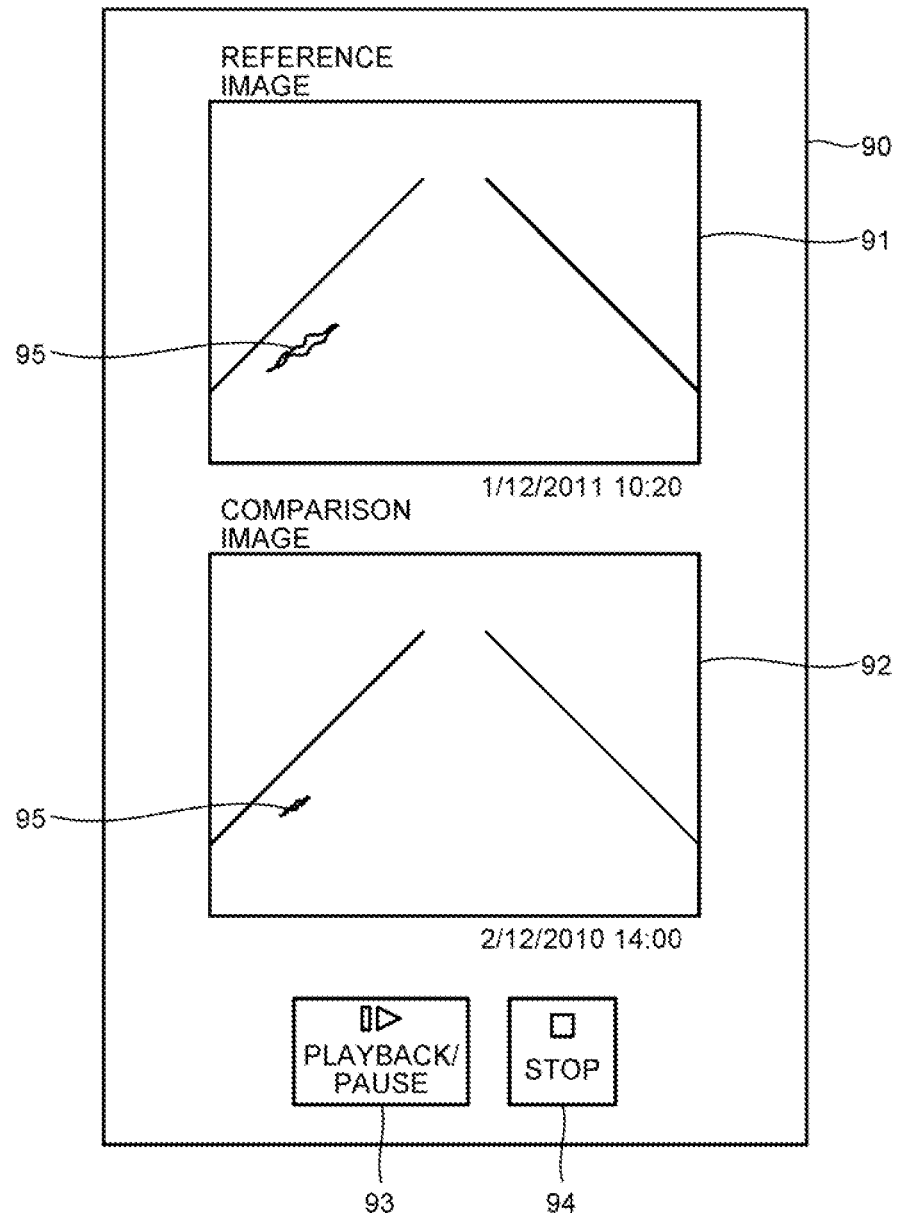
FIG. 10 is a view illustrating an example of a playback screen.

FIG. 10 is a view illustrating an example of the playback screen. As illustrated in FIG. 10, a playback screen 90 includes a display area 91 that displays a reference image, a display area 92 that displays the image of a comparison target, a playback/pause button 93 that instructs playback/pause, and a stop button 94 that instructs a stop. The display area 91 displays the images of the video data 32a set as the survey route. The display area 92 displays the images of the video data 32a set as the comparison target. The playback/pause button 93 pauses the playback of the video data 32a if selected during the playback of the video data 32a, and resumes the playback of the video data 32a if selected during the pause. If the stop button 94 is selected, the survey screen 80 is displayed. The user compares the reference image and the comparison image, which are displayed on the playback screen 90, to survey changes in roads.

Even if images of each of the video data 32a are checked individually, it may be difficult to distinguish between the degradation of a road and dirt on a road. For example, it may be difficult to distinguish a black region shown on the road in the video between a puddle and a pothole. Moreover, the video data 32a are different in weather and road congestion of when the vehicle ran, and it may be difficult to distinguish the degradation of a road by image processing. Hence, the survey apparatus 12 plays back the images of the road shot in different times next to each other to facilitate the user's distinguishing a degradation state.

Moreover, each of the video data 32a has different conditions such as the driving speed of the vehicle at the time of shooting and whether or not the vehicle stopped at a traffic signal. Therefore, if the video data 32a set as the survey route and the video data 32a set as the comparison target are played back the normal way respectively, the shooting positions of the images do not correspond; accordingly, it is difficult for the user to understand a change of a road. Hence, the playback to display corresponding comparison images in accordance with the reference images is performed on the playback screen. Accordingly, the user can compare images in the same position, and therefore it becomes easier to understand a change of a road.

In the example of FIG. 10, degradation 95 such as a crack in the road surface is shown in the reference image and the comparison image. If comparing the reference image and the comparison image on the playback screen 90 illustrated in FIG. 10, the user can distinguish that the degradation 95 has progressed in approximately one year.

Figure 11:
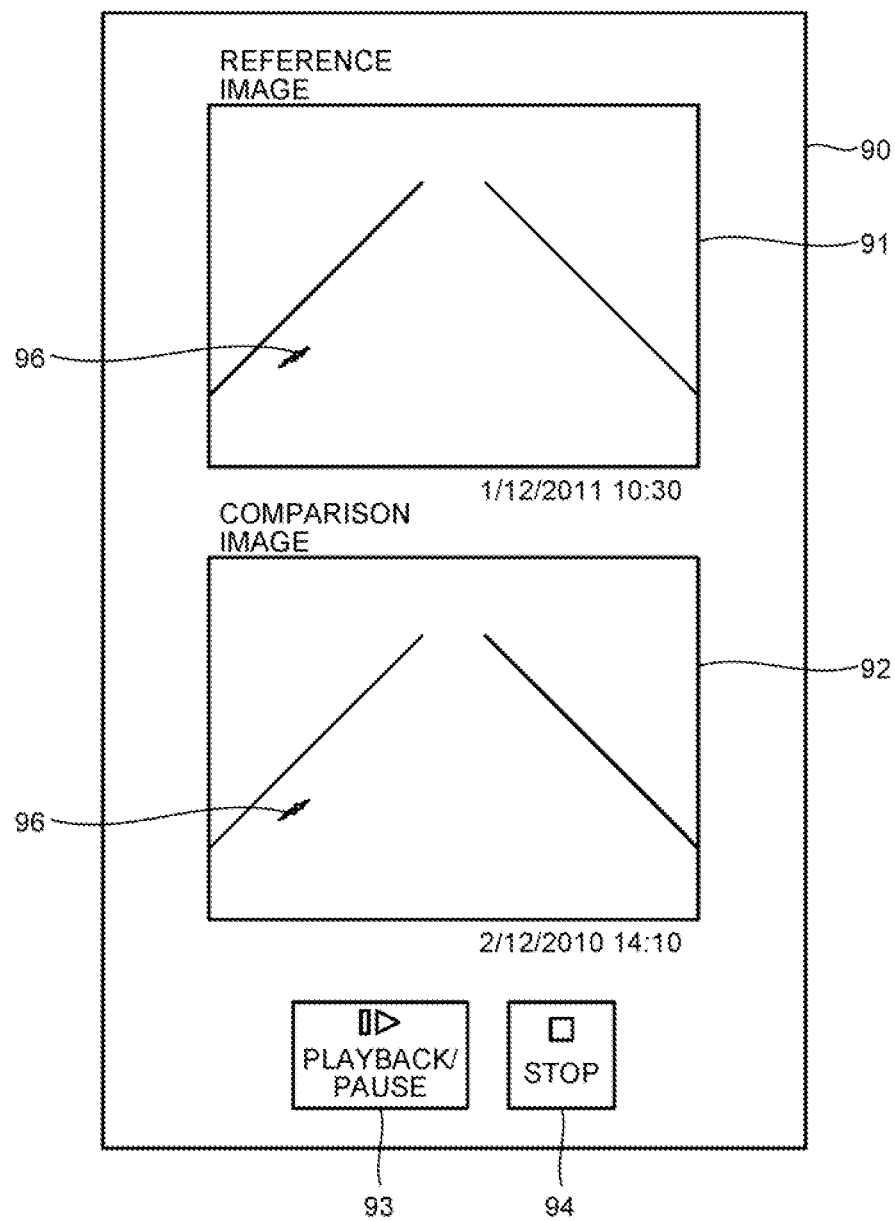
FIG. 11 is a view illustrating an example of the playback screen that displays a different position.

FIG. 11 is a view illustrating an example of the playback screen that displays a different position. Also in the example of FIG. 11, degradation 96 such as a crack in the road surface is shown in the reference image and the comparison image. If comparing the reference image and the comparison image on the playback screen 90 illustrated in FIG. 11, the user can distinguish that the degradation 96 has not progressed much in approximately one year.

Figure 12:
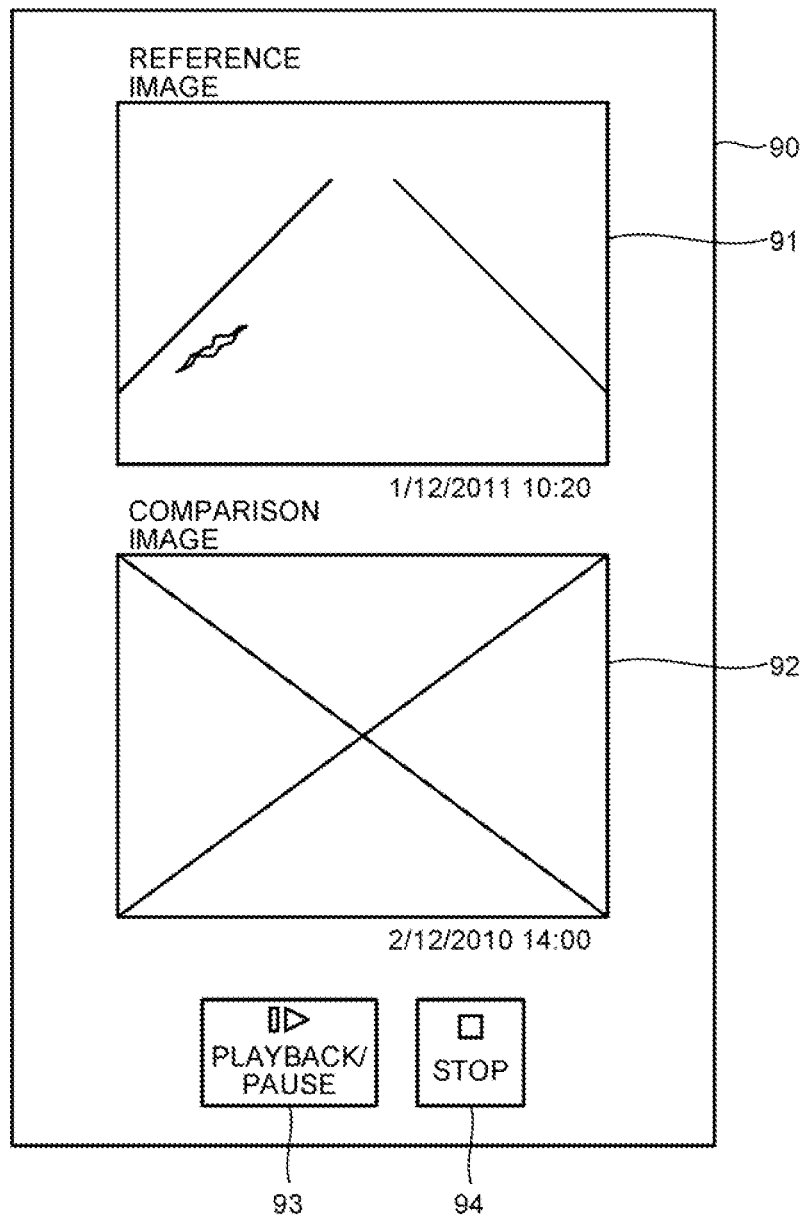
FIG. 12 is a view illustrating and example of the playback screen where the image of the comparison target has become undisplayed.

Moreover, if the corresponding shooting position of the image of the comparison target is beyond the tolerance value with the shooting position of the reference image as a reference, the image of the comparison target becomes undisplayed and the image is not displayed in the display area 92 on the playback screen 90. FIG. 12 is a view illustrating an example of the playback screen where the image of the comparison target has become undisplayed. Also in the example of FIG. 12, the corresponding shooting position of the image of the comparison target is beyond the tolerance value with the shooting position of the reference image as a reference; accordingly, an "x" sign is displayed in the display area 92 and the image of the comparison target is undisplayed.

Figure 13:
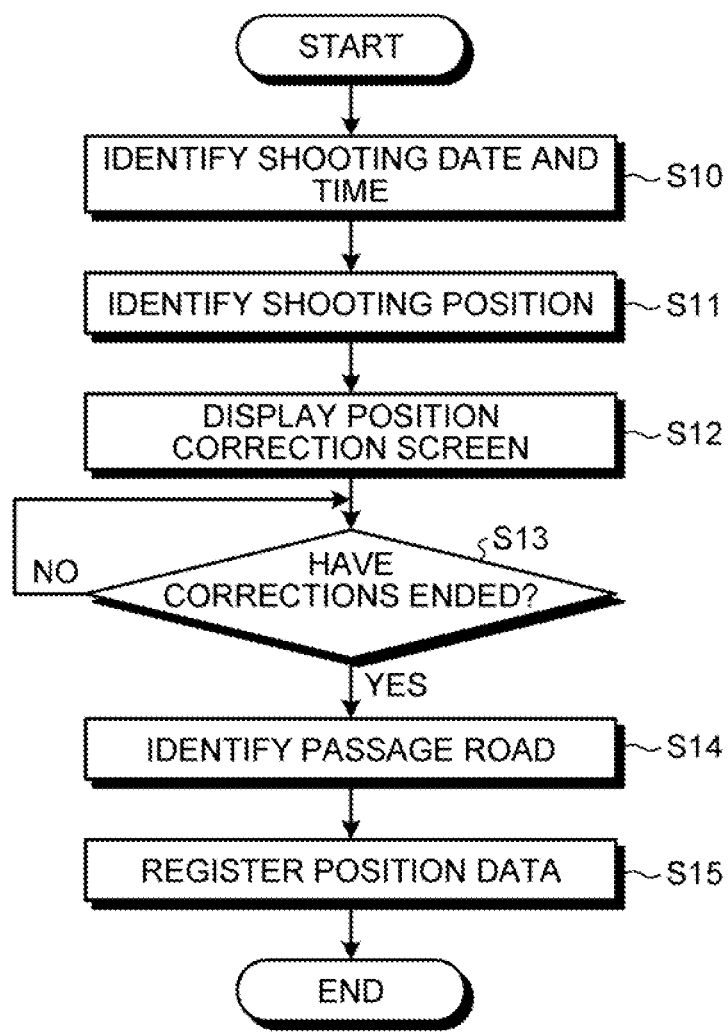
FIG. 13 is a flowchart illustrating the procedure of a derivation process.

Next, a description will be given of the flow of a derivation process to derive the position data 32c by the survey apparatus 12 according to the embodiment. FIG. 13 is a flowchart illustrating the procedure of the derivation process. The derivation process is executed at a timing when the video data 32a and the numerical data 22b, which are obtained by the recording apparatus 11 running on the road, stored in the storage unit 22, for example. The derivation process may be executed at a timing when a predetermined operation to instruct the derivation of position data is performed on the survey apparatus 12, for example.

As illustrated in FIG. 13, the identification unit 33a identifies the shooting dates and times of the images of the video data 32a from the record start date and time and the frame rate of the video data 32a, for example (Step S10). The identification unit 33a then identifies the shooting positions of the images of the video data 32a by interpolation from the positions and dates and times when the positions were calculated, which are included in the numerical data 32b (Step S11). The correction unit 33b causes the terminal 13 to display the position correction screen 60 and accepts corrections of the shooting positions of the images of the frames of the video data 32a (Step S12). The correction unit 33b determines whether or not the OK button 64 of the position correction screen 60 has been selected to instruct the completion of correction (Step S13). If the completion of correction has not been instructed (Step S13 negative), the correction unit 33b moves to Step S13 again and waits for an instruction to complete correction.

On the other hand, if the completion of correction has been instructed (Step S13 positive), the registration unit 33c maps the specified shooting positions of the images on the map and identifies the passage road from the shooting positions (Step S14). The registration unit 33c then sets the identified passage road as a comment, and registers in the storage unit 32 position data indicating the shooting positions of the images, the shooting positions having been specified by the position correction screen 60 (Step S15), and ends the process. Therefore, the position data 32c are stored in the storage unit 32.

Figure 14:
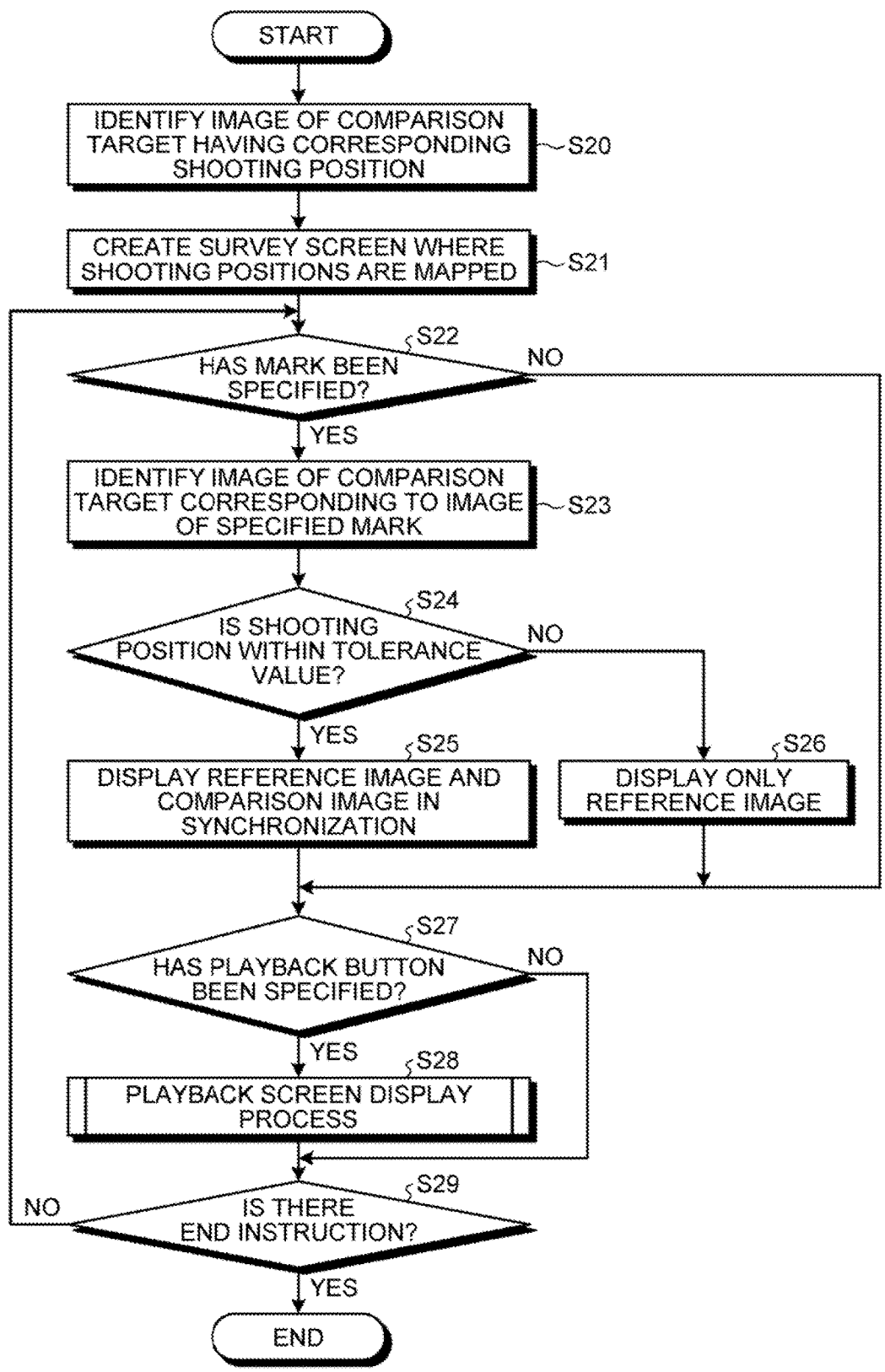
FIG. 14 is a flowchart illustrating the procedure of a survey screen display process.

Next, a description will be given of the flow of a survey screen display process that the survey apparatus 12 according to the embodiment causes the terminal 13 to display the survey screen. FIG. 14 is a flowchart illustrating a flowchart of the procedure of the survey screen display process. The survey screen display process is executed, for example, at a timing when the video data 32a of the survey route and the comparison target are selected and the OK button 73 is selected on the video data specification screen 70.

As illustrated in FIG. 14, with regard to the images of the video data 32a of the survey route, the determination unit 33e identifies the images of the video data 32a of the comparison target having the corresponding shooting positions, for each passage road of the survey route (Step S20). The creation unit 33f creates the image information of the survey screen 80 where the shooting positions of the images of the video data 32a set as the survey route are mapped on the map in the display area 81 to transmit to the terminal 13 (Step S21). The creation unit 33f determines whether or not any of the mapped marks 82 in the display area 81 on the survey screen 80 has been specified (Step S22). If any of the marks 82 has been specified (Step S22 positive), the determination unit 33e identifies the image of the video data 32a of the comparison target, which corresponds to the image of the specified mark 82 (Step S23). The determination unit 33e then determines whether or not the shooting position of the image of the video data 32a of the comparison target is within tolerance value with the shooting position of the image of the specified mark 82 as a reference (Step S24).

If the shooting position is within the tolerance value (Step S24 positive), the creation unit 33f sets the specified image of the survey route in the display area 83, and creates the image information of the survey screen 80 where the corresponding image of the comparison target is set in the display area 84 to transmit to the terminal 13 (Step S25). Therefore, the survey screen 80 where the specified image of the survey route and the corresponding image of the comparison target are displayed is displayed on the terminal 13. On the other hand, if it is determined that the shooting position is beyond the tolerance value (Step S24 negative), the creation unit 33f sets the specified image of the survey route in the display area 83, and creates the image information of the survey screen 80 where an "x" sign is set in the display area 84 to transmit to the terminal 13 (Step S26). Therefore, the survey screen 80 where the specified image of the survey route is displayed and the corresponding image of the comparison target is undisplayed is displayed on the terminal 13.

If no mark 82 has been specified (Step S22 negative), the creation unit 33f determines whether or not the playback button 85 has been specified (Step S27). If the playback button 85 has been specified (Step S27 positive), a playback screen display process, which will be described later, is executed (Step S28). If the playback button 85 has not been specified (Step S27 negative), the creation unit 33f determines whether or not a predetermined operation to instruct the end of the process has been performed (Step S29). If the predetermined operation to instruct the end of the process has not been performed (Step S29 negative), move to the above Step S22. On the other hand, if the predetermined operation to instruct the end of the process has been performed, the creation unit 33f ends the process.

Figure 15:
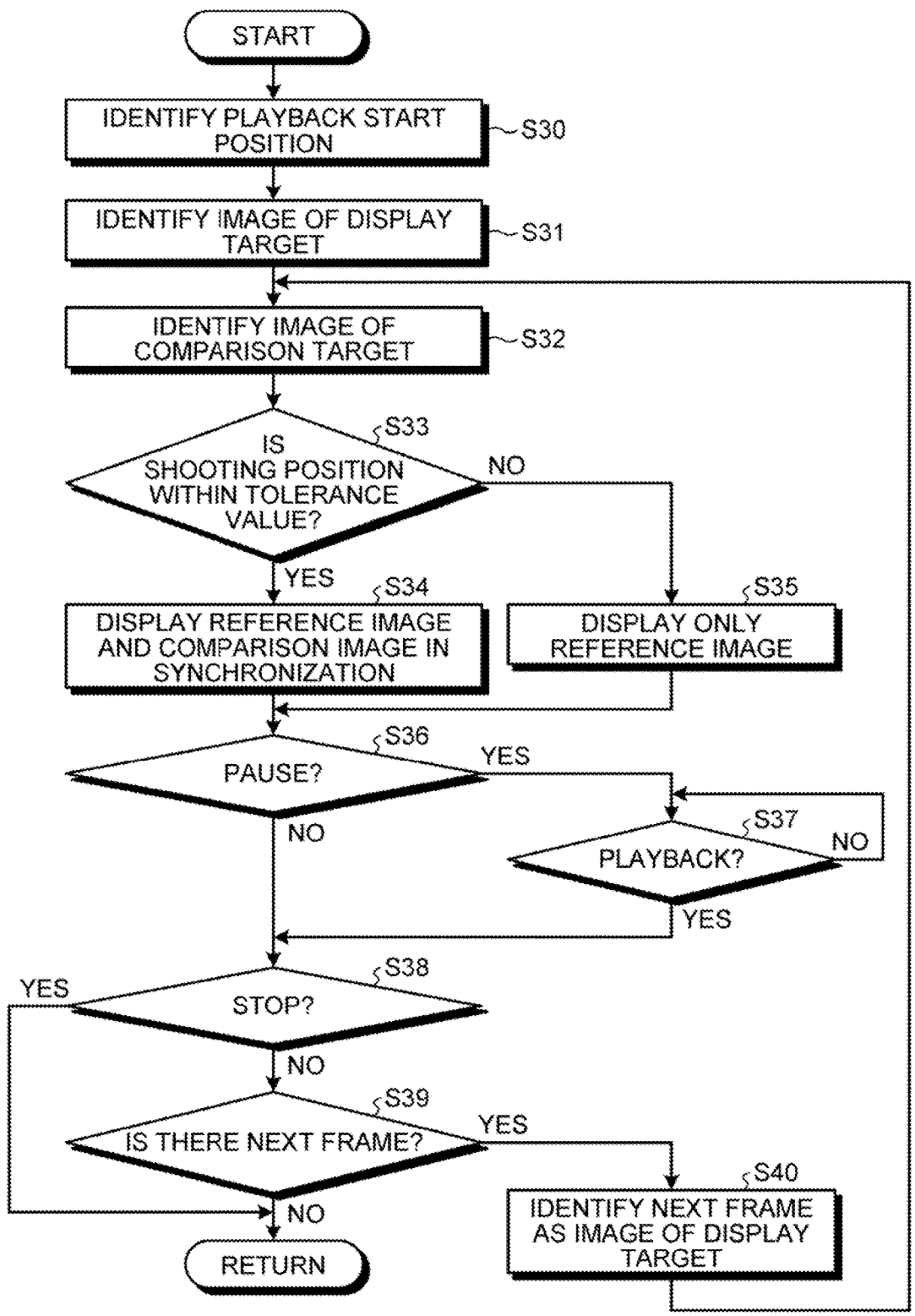
FIG. 15 is a flowchart illustrating the procedure of a playback screen display process.

Next, a description will be given of the flow of the playback screen display process where the survey apparatus 12 according to the embodiment causes the terminal 13 to display the playback screen. FIG. 15 is a flowchart illustrating the procedure of the playback screen display process.

As illustrated in FIG. 15, the creation unit 33f identifies the specified position as the playback start position if the mark 82 has been specified on the survey screen 80, and identifies the start of the video data 32a of the survey route as the playback start position if the mark 82 has not been specified (Step S30). The creation unit 33f identifies the image of the video data 32a of the survey route, the image having been identified as the playback start position, as the image of a display target (Step S31). The determination unit 33*e* identifies the image of the video data 32*a* of the comparison target, the image corresponding to the image of the display target of the video data 32*a* of the survey route (Step S32). The determination unit 33*e* then determines whether or not the shooting position of the image of the video data 32*a* set as the comparison target is within the tolerance value with the shooting position of the image of the display target of the video data 32*a* set as the survey route as a reference (Step S33).

If it is determined that the shooting position is within the tolerance value (Step S33 positive), the creation unit 33*f* sets the image of the display target in the display area 91, and creates the image information of the playback screen 90 where the corresponding image of the comparison target is set in the display area 92 to transmit to the terminal 13 (Step S34). Therefore, the playback screen 90 where the image of the display target of the survey route and the corresponding image of the comparison target are displayed is displayed on the terminal 13. On the other hand, if it is determined that the shooting position is beyond the tolerance value (Step S33 negative), the creation unit 33*f* sets the image of the display target in the display area 91, and creates the image information of the playback screen 90 where an "x" sign is set in the display area 92 to transmit to the terminal 13 (Step S35). Therefore, the playback screen 90 where the image of the display target of the survey route is displayed and the corresponding image of the comparison target is undisplayed is displayed on the terminal 13.

The creation unit 33*f* determines whether or not the playback/pause button 93 has been selected to instruct a pause (Step S36). If a pause has not been instructed (Step S36 negative), move to Step S38, which will be described later. On the other hand, if a pause has been instructed (Step S36 positive), the creation unit 33*f* determines again whether or not the playback/pause button 93 has been selected to instruct playback (Step S37). If playback has not been selected (Step S37 negative), the creation unit 33*f* moves to Step S37 again to wait for an instruction to play back. On the other hand, if playback has been selected (Step S37 positive), move to Step S38, which will be described later.

The creation unit 33*f* determines whether or not the stop button 94 has been selected to instruct stop of the playback (Step S38). If stop of the playback has been instructed (Step S38 positive), the creation unit 33*f* ends the playback screen display process and returns to the above survey screen display process. On the other hand, if stop of the playback has not been instructed (Step S38 negative), the creation unit 33*f* determines whether or not there is a next frame in the video data 32*a* of the survey route (Step S39). If there is a next frame (Step S39 positive), the creation unit 33*f* sets the image of the next frame of the video data 32*a* of the survey route as the image of the display target (Step S40), and moves to the above Step S32. On the other hand, if there is no next frame (Step S39 negative), the creation unit 33*f* ends the playback screen display process, and returns to the above survey screen display process.

In this manner, the survey apparatus 12 stores in the storage unit 32 a plurality of the video data 32*a* that are image information of a plurality of images of roads, which were continuously shot by the camera 20 mounted on the vehicle, and were shot by driving the vehicle on the respective roads several times. In other words, the survey apparatus 12 stores in the storage unit 32 a plurality of pieces of image information including a plurality of images of roads, which were continuously shot by a shooting unit mounted on a vehicle. Moreover, the survey apparatus 12 stores in the storage unit 32 a plurality of the position data 32*c* indicating the shooting positions of the images of their respective corresponding video data 32*a*. With regard to the images of the video data 32*a* where a road set as the survey target has been shot, the survey apparatus 12 determines whether or not the shooting position of the image is within the tolerance value with the shooting position of any image as a reference, for each of the images having corresponding shooting positions. If it is determined that the shooting position is within the tolerance value, the survey apparatus 12 creates the screen information of a screen to display the image determined to be within the tolerance value in synchronization. Moreover, if it is determined that the shooting position is beyond the tolerance value, the survey apparatus 12 creates the screen information of a screen where the image determined to be beyond the tolerance value is undisplayed. The survey apparatus 12 outputs the created screen information from the communication I/F 31 to the terminal 13. Hence, according to the survey apparatus 12, it is possible to suppress the comparison of images of different lanes since one of the images of the different lanes, which has been determined to be beyond the tolerance value, becomes undisplayed.

Moreover, the survey apparatus 12 acquires the video data 22*a* shot by the camera 20 by the vehicle running once and the numerical data 22*b* indicating the shooting positions of the images in a longer cycle than the shooting cycle of the camera 20. The survey apparatus 12 identifies the shooting positions of the images of the video data 22*a* by interpolation from the shooting positions of the images, which are indicated by the numerical data 22*b*. The survey apparatus 12 registers in the storage unit 32 the video data 22*a* and the position data 32*c* indicating the identified shooting positions of the images. Hence, according to the survey apparatus 12, even if the shooting positions of only a part of the images of the video data 22*a* are registered in the recording apparatus 11, it is possible to identify the shooting positions of the images of the video data 22*a* and survey roads.

Moreover, the survey apparatus 12 identifies a distance in a depth direction corresponding to a position in a longitudinal direction of an image that can recognize a road surface and a distance in a right and left direction corresponding to an area width in a lateral direction of the image in the position in the longitudinal direction, from a fitting angle of the camera 20 and the camera 20's angle of view. The survey apparatus 12 then calculates coordinates in three-dimensional space in a region shown in the image from the identified distances in the depth direction and the right and left direction, and decides on the tolerance value based on whether or not the distance between the shooting positions is included in the calculated coordinates. Hence, according to the survey apparatus 12, it is possible to determine whether to be an imaging target shown in a region where images shot from two imaging positions overlap by determining by use of the decided tolerance value.

Moreover, the survey apparatus 12 accepts specification of an image set as a reference. The survey apparatus 12 determines whether or not the shooting position of each image is within the tolerance value with the shooting position of the specified image as a reference. Hence, according to the survey apparatus 12, it is possible to specify an image in accordance with the object of a survey and survey roads. For example, if a survey is conducted with two video data 32*a* where the same road was shot at different times, it is possible to determine a current degradation state and the progressive speed of degradation by making a comparison with the former video data 32*a* with the new video data 32*a* as a reference. For example, in the example of FIG. 10, the degradation 95 itself is large, and a change is also large between the reference image and the comparison image; accordingly, it is possible to determine that the progress of degradation is rapid and an urgent repair is needed. Moreover, for example, in the example of FIG. 11, the degradation 96 itself is small, and a change is small between the reference image and the comparison image; accordingly, it is possible to determine that the progress of degradation is slow and an urgent repair is not needed. On the other hand, if a survey is conducted with two video data 32a where the same road was shot at different times, it is possible to conduct a survey on the progress of degradation by making a comparison with the new video data 32a with the old video data 32a as a reference. For example, if the degradation in the reference image that displays an image of the old video data 32a is small and the degradation in the comparison image that displays an image of the new video data 32a is large, it is possible to determine that the progress of such degradation is rapid. Moreover, for example, in the example of FIG. 11, the degradation 96 itself is small, and a change is small between the reference image and the comparison image; accordingly, it is possible to determine that the progress of degradation such as the degradation 96 is slow.

[b] Second Embodiment

The description has hitherto been given of the embodiment related to the apparatus of the disclosure; however, the technology of the disclosure can be embodied in various different forms other than the above-mentioned embodiment. The other embodiment included in the invention will be described below.

Figure 16:
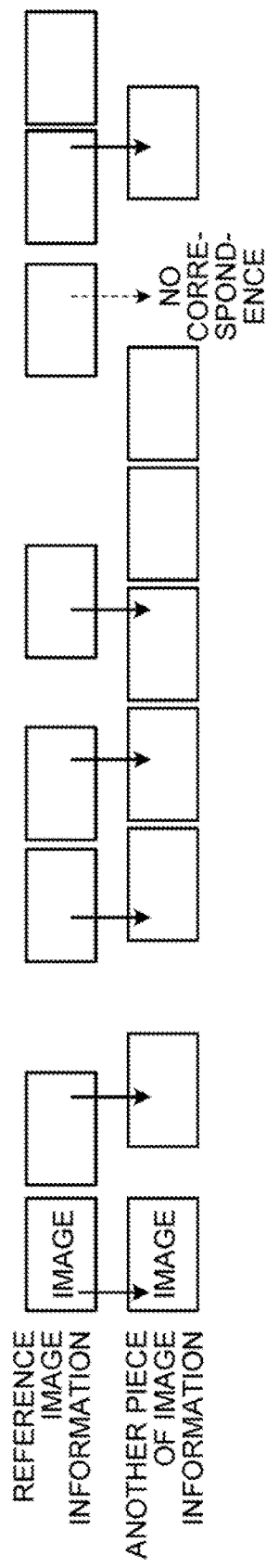
FIG. 16 is a view schematically illustrating the playback of images shot by a digital still camera.

For example, the case where video data shot by a video camera are used as image information of a plurality of continuously shot images was described in the first embodiment; however, the apparatus of the disclosure is not limited to this. For example, image information of a plurality of images continuously shot by a digital still camera may be used. Also if roads are shot by a digital camera in this manner, an image of another piece of image information is displayed in synchronization with an image of reference image information with any of image information where a road set as a survey target was shot in different times as a reference. FIG. 16 is a view schematically illustrating the playback of images shot by a digital still camera. The creation unit 33f creates image information of images that successively displays the images of the reference image information. Moreover, the creation unit 33f creates the image information of the images to be displayed in synchronization if there are images of the other image information where the shooting positions correspond to the images of the reference image information. Also in this case, it is determined from the shooting positions of the images of the reference image information that the shooting positions of the images of the other image information are within the tolerance value, the images that have been determined that the shooting positions are within the tolerance value are displayed in synchronization, and the images that have been determined that the shooting positions are beyond the tolerance value are made undisplayed.

Moreover, the case of determining whether or not the shooting position of the image of the video data 32a set as the comparison target is within the tolerance value with the shooting position of the image of the video data 32a set as the survey route as a reference was described in the above embodiment; however, the embodiment is not limited to this. For example, the travel direction of the vehicle may be obtained from change over time of the shooting positions indicated by the position data 32c corresponding to the video data 32a set as the survey route and it may be determined whether or not the shooting position with respect to a cross direction relative to the travel direction of the vehicle is within the tolerance value. The travel direction of the vehicle may be obtained, for example, by the least-squares method and analyses, such as simple regression analysis and multiple regression analysis, of the shooting positions from one that is determined whether to be within the tolerance value until before a predetermined time. The predetermined time may be decided to be several seconds to several minutes, for example. The cross direction relative to the travel direction of the vehicle may be a direction perpendicular to the travel direction in the shooting position that is determined whether to be within the tolerance value, for example. Moreover, the cross direction may be a direction perpendicular to an average travel direction by obtaining the average travel direction of the vehicle from the shooting position that is determined whether to be within the tolerance value until before the predetermined time.

Moreover, the case where the survey apparatus 12 outputs the image information of various operation screens from the communication I/F 31 to display on the terminal 13 was described in the above embodiment, but the embodiment is not limited to this. For example, the image information of various operation screens may be outputted to a display unit, such as a display, that is provided to the survey apparatus 12 to be displayed on the display unit, and operation information for the operation screens may be obtained from operation units, such as a mouse and a keyboard, that are provided to the survey apparatus 12.

Moreover, the case where two images where the same road was shot in different times are displayed next to each other on the survey screen 80 was described in the above embodiment, but the embodiment is not limited to this. For example, three and more images where the same road was shot in different times may be displayed next to each other.

Moreover, the illustrated elements of the apparatuses are functionally conceptual, and do not necessarily need to be physically configured as illustrated. In other words, the specific states of the distribution and integration of the apparatuses are not limited to those illustrated, and all or part of them can be configured by being functionally and physically distributed or integrated in an arbitrary unit in accordance with various loads, use conditions, and the like. For example, the processing units of the identification unit 33a, the correction unit 33b, the registration unit 33c, the acceptance unit 33d, the determination unit 33e and the creation unit 33f of the survey apparatus 12 may appropriately be integrated. Moreover, the process of each processing unit may appropriately be separated to the processes of a plurality of processing units. Furthermore, all or part of the processing functions performed in the processing units can be realized by a CPU and a program where an analysis is executed in the CPU or be realized as hardware by wired logic.

Survey Program

Figure 17:
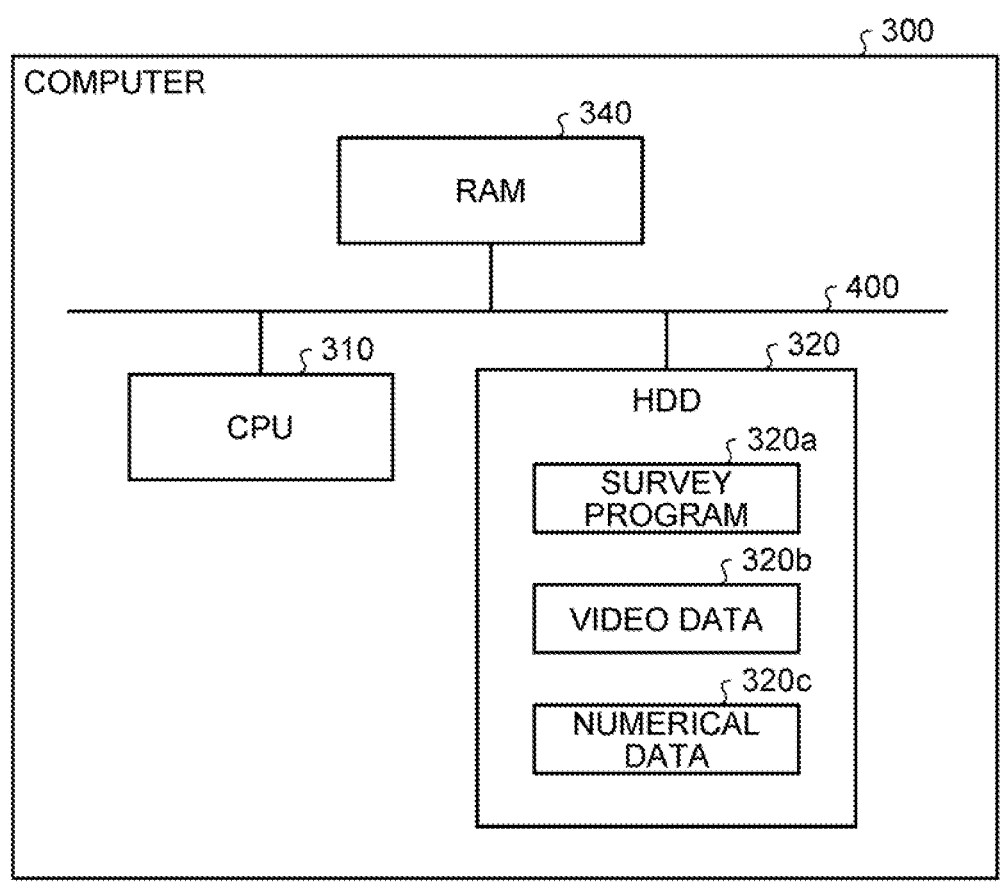
FIG. 17 is a view illustrating a computer that executes a survey program.

Moreover, the various processes described in the above embodiments can be realized by executing a program prepared in advance by computer systems such as a personal computer and a work station. A description will be given below of an example of a computer system that executes a program including functions similar to the above embodiments. FIG. 17 is a view illustrating a computer that executes a survey program.

As illustrated in FIG. 17, a computer 300 includes a CPU (Central Processing Unit) 310, an HDD (Hard Disk Drive) 320, and a RAM (Random Access Memory) 340. These units of 300 to 340 are connected via a bus 400.

A survey program 320a that exerts functions similar to those of the identification unit 33a, the correction unit 33b, the registration unit 33c, the acceptance unit 33d, the determination unit 33e and the creation unit 33f of the survey apparatus 12 is previously stored in the HDD 320. The survey program 320a may appropriately be separated.

Moreover, various information is stored in the HDD 320. For example, video data 320b and numerical data 320c, which correspond to the video data 32a and the numerical data 32b, which are illustrated in FIG. 1, are stored in the HDD 320.

The CPU 310 reads the survey program 320a from the HDD 320 to deploy into the RAM 340, and executes the processes using the video data 320b and the numerical data 320c, which are stored in the HDD 320. In other words, the survey program 320a executes functions similar to those of the identification unit 33a, the correction unit 33b, the registration unit 33c, the acceptance unit 33d, the determination unit 33e and the creation unit 33f.

The survey program 320a is not necessarily needed to be stored in the HDD 320 from the start.

For example, a program is stored in "portable physical media" such as a flexible disk (FD), a CD-ROM, a DVD disk, a magneto-optical disk, and an IC card, which are inserted into the computer 300. The computer 300 may read the program from them and execute the program.

Furthermore, the program is stored in "another computer (or a server)" and the like, which are connected to the computer 300 via a public circuit, the Internet, LAN, WAN, and the like. The computer 300 may read the program from them and execute the program.

According to an aspect of the survey apparatus disclosed in the application, it is possible to play back only images where the same target is displayed in synchronization when a plurality of images is displayed in synchronization, corresponding to their positions.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A survey apparatus comprising:
a memory; and
a processor coupled to the memory, the processor being configured to execute a process including:
acquiring a plurality of sets of image information, each of the sets of image information including a plurality of images of a road and a plurality of position information, the images being continuously shot by a camera mounted on a vehicle in a shooting cycle, the plurality of position information respectively corresponding to images among the images shot by the camera, indicating shooting positions of the images, and being acquired in a longer cycle than the shooting cycle of the camera;
calculating shooting positions of images among the images shot by the camera, for which the shooting positions have not been acquired, by an interpolation using a number of images shot during the longer cycle, the memory storing the acquired plurality of sets of image information and a plurality of position information including the acquired plurality of position information and the calculated shooting positions;
determining, by referring to the memory, whether a shooting position of a first image is within a tolerance value from a shooting position of a second image based on a first set of image information and a second set of image information, the first image being included in the first set of image information, the second image being included in the second set of image information, the first set of image information and the second set of image information being each one of the plurality of sets of image information, the first set of image information and the second set of image information being shot respectively in a first time and a second time;
creating, when determining that the shooting position of the first image is within the tolerance value, screen information of a screen where the first image included in the first set of image information is displayed in synchronization with the second image included in the second set of image information, and when the shooting position of the first image is determined to be beyond the tolerance value, creating screen information of a screen where the first image included in the first set of image information is undisplayed; and
outputting the created screen information.

2. The survey apparatus according to claim 1, the process further including accepting designation of a set of image information as the second set of image information.

3. A survey apparatus comprising:
a memory; and
a processor coupled to the memory, the processor being configured to execute a process including:
referring to the memory that stores a plurality of sets of image information, each of the sets of image information including a plurality of images of a road and a plurality of position information, the images having been continuously shot by a camera mounted on a vehicle, the plurality of position information respectively corresponding to the plurality of images and respectively indicating shooting positions of the plurality of images;
determining whether a shooting position of a first image is within a tolerance value from a shooting position of a second image based on a first set of image information and a second set of image information, the first image being included in the first set of image information, the second image being included in the second set of image information, the first set of image information and the second set of image information being each one of the plurality of sets of image information, the first set of image information and the second set of image information being shot respectively in a first time and a second time, wherein the tolerance value is set by calculating a distance in a depth direction corresponding to a length in a longitudinal direction of the second image and a distance in a right and left direction corresponding to a width in a lateral direction of the second image versus the longitudinal direction, using a fixing angle of the camera and the camera's angle of view to calculate coordinates in a three-dimensional space of a region shown in the second image, and by determining whether or not the first image and the second image at least partially overlap using the calculated coordinates and a distance between the first image and the second image.

4. A non-transitory computer-readable storage medium storing a survey program causing a computer to perform:
determining whether a shooting position of a first image is within a tolerance value from a shooting position of a second image based on a first set of image information, a second set of image information, and a plurality of position information, the first image being included in the first set of image information, the second image being included in the second set of image information, the first set of image information and the second set of image information being each one of a plurality of sets of image information that are stored in a storage unit, each of sets of image information including a plurality of images of a road that have been continuously shot by a camera mounted on a vehicle, the first set of image information and the second set of image information being shot respectively in a first time and a second time, the storage unit also storing the plurality of position information, that respectively correspond to the plurality of images and indicate shooting positions of the plurality of images, wherein the plurality of position information are acquired in a longer cycle than a shooting cycle of the camera and include shooting positions calculated for images, for which the shooting positions have not been acquired, by an interpolation using a number of images shot during the longer cycle; and
creating, when the shooting position of the first image is determined to be within the tolerance value, screen information of a screen where the first image included in the first set of image information is displayed in synchronization with the second image included in the second set of image information, and when the shooting position of the first image is determined to be beyond the tolerance value, creating screen information of a screen where the first image included in the first set of image information is undisplayed.

5. A survey method comprising:
determining, by a computer, whether a shooting position of a first image is within a tolerance value from a shooting position of a second image based on a first set of image information, a second set of image information, and a plurality of position information, the first image being included in the first set of image information, the second image being included in the second set of image information, the first set of image information and the second set of image information being each one of a sets of image information that are stored in a storage unit, each of the plurality of sets of image information including a plurality of images of a road that have been continuously shot by a camera mounted on a vehicle, the first set of image information and the second set of image information being shot respectively in a first time and a second time, the storage unit also storing the plurality of position information, that respectively correspond to the plurality of images and indicate shooting positions of the plurality of images, wherein the plurality of position information are acquired in a longer cycle than a shooting cycle of the camera and include shooting positions calculated for images, for which the shooting positions have not been acquired, by an interpolation using a number of images shot during the longer cycle; and
creating, when the shooting position of the first image is determined to be within the tolerance value, screen information of a screen where the first image included in the first set of image information is displayed in synchronization with the second image included in the second set of image information, and when the shooting position of the first image is determined to be beyond the tolerance value, creating screen information of a screen where the first image included in the first set of image information is undisplayed.

* * * * *